W. Gilbert.
Composite Roofing.
Nº 58,246. Patented Sept. 25, 1866.
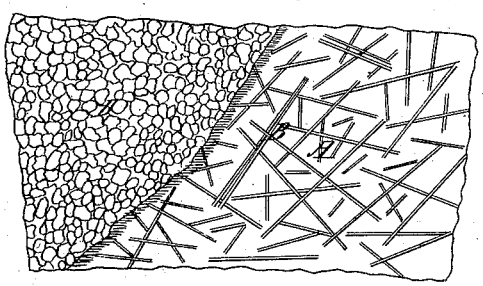
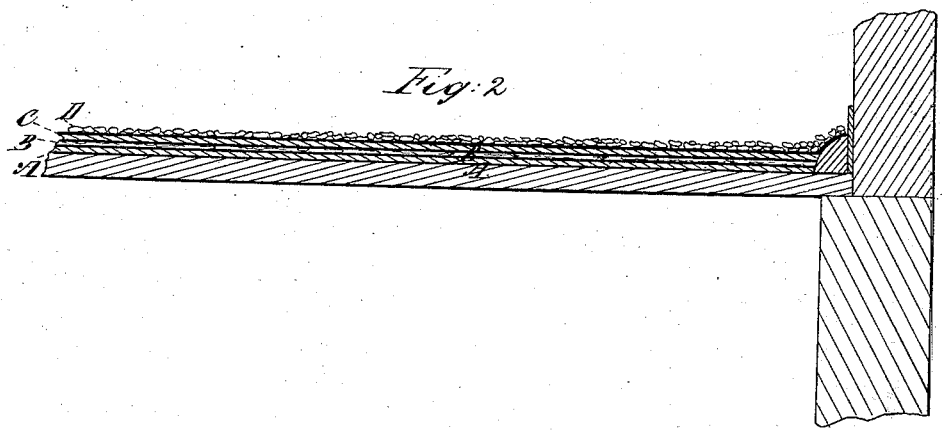

UNITED STATES PATENT OFFICE.

WILLIAM GILBERT, OF DETROIT, MICHIGAN.

IMPROVED ROOFING.

Specification forming part of Letters Patent No. 58,246, dated September 25, 1866.

*To all whom it may concern:*

Be it known that I, WILLIAM GILBERT, of Detroit, in the county of Wayne and State of Michigan, have invented a new and Improved Roofing; and I do hereby declare that the following is a full, clear, and exact description thereof, which will enable others skilled in the art to make and use the same, reference being had to the accompanying drawings, forming part of this specification.

My invention consists, first, in the employment of a layer of long fibers of swamp-grass, hemp, straw, or any other tough fibrous material placed between the layers of felt, the said fibers not to be woven into cloth, but spread so as to form a net-work, and put together by a cement; secondly, it consists in the employment or use, in the making of roofs, of a cement consisting of distilled coal-tar and common slaked lime.

The accompanying drawings illustrate my invention.

Figure 1 shows a layer of swamp-grass between two layers of felt. Fig. 2 is a longitudinal section of a portion of the roofing when lying upon a roof.

Similar letters of reference indicate like parts.

A designates a layer of felt, such as is usually employed for roofing. Upon this there is a layer of swamp-grass, B, the stalks or stems being about two or three inches in length. These are so strewn upon the felt as to form a net-work. C is another layer of felt, similar to the layer A. The whole is put together by a cement composed of distilled coal-tar and common slaked lime, and pressed compact through rollers, when it is ready to be laid upon the roof. Having been laid upon the roof and all the joints lapped and well cemented and cleated with thin cleats, it may then be covered with the cement, and gravel or sand thrown upon it in the usual way.

The distinctive feature of the invention is the employment of the layer or net-work of swamp-grass, hemp, straw, &c., also a cement of distilled coal-tar and common slaked lime, which has never heretofore been used, and which I find of great utility.

What I claim as new, and desire to secure by Letters Patent, is—

1. In roofings for buildings, the employment of a layer or net-work of swamp-grass, hemp, straw, or any other tough fibrous material placed between the layers of the material employed for the roofing, substantially as described.

2. For holding together the materials of which prepared roofing is made, a cement composed of distilled coal-tar and common slaked lime, as herein specified.

The above specification of my invention signed by me this 17th day of April, 1866.

WILLIAM GILBERT.

Witnesses:
JULIUS STOLL,
HENRY C. KNIGHT.